3,174,988
PERFLUOROALKYL ISOTHIOCYANATES
Frank S. Fawcett and William Channing Smith, Wilmington, Del., assignors to E. I. du Pont de Nemours and Company, Wilmington, Del., a corporation of Delaware
No Drawing. Filed Aug. 29, 1963, Ser. No. 305,532
4 Claims. (Cl. 260—454)

This invention relates to a new class of isothiocyanates.
The products of this invention are lower perfluoroalkyl isothiocyanates having the general formula

wherein $R_f$ is perfluoroalkyl of 1–8 carbon atoms. Broadly speaking, these products can be obtained by contacting and reacting a phosphorus sulfide with a perfluoro-2-aza-1-alkene having up to 9 carbon atoms or with an N-trifluoromethyl-N-perfluoroalkylamine in which the perfluoroalkyl group contains up to 8 carbon atoms, or by reacting the latter compound with hydrogen sulfide.

More particularly, the lower perfluoroalkyl isothiocyanates of this invention can be prepared by reaction of a perfluoro-2-aza-1-alkene, alternatively named a perfluoroazomethine, having up to 9 carbon atoms, i.e., a compound of the formula

wherein $R_f$ is perfluoroalkyl of 1–8 carbon atoms, with a phosphorus sulfide at a temperature of 100–500° C. The perfluoroalkyl isothiocyanate that is formed is isolated from the reaction mixture by conventional means, e.g., by fractional distillation.

Phosphorus sulfides that can be used include the known $P_4S_{10}$, $P_4S_7$, $P_4S_3$ and $P_4S_5$. $P_4S_{10}$, commonly known as phosphorus pentasulfide, is preferred because it is more reactive, and is readily available. The reaction involving phosphorus pentasulfide is illustrated by the following equation:

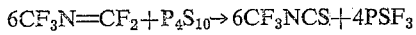

In the reaction of the perfluoro-2-aza-1-alkenes with the preferred phosphorus pentasulfide ($P_4S_{10}$), the proportions of reactants are not critical. Some perfluoroalkyl isothiocyanate will be formed when an excess of either reactant is employed. However, it is preferred that the molar ratio of the perfluoro-2-aza-1-alkene to phosphorus pentasulfide ($P_4S_{10}$) range from 10:1 to 1:1. Since any moisture present in the reaction system will react with phosphorus pentasulfide or with the perfluoro-2-aza-1-alkene and thus waste the reactants, it is preferred that anhydrous reactants and dry equipment be employed. The reaction temperature can vary from 100° C. up to 500° C. Preferably, temperatures of 125–200° C. are employed. The reaction is conveniently carried out in a closed reaction vessel under the autogenous pressure developed by the reactants and products under the reaction conditions. The time required for completion of the reaction between the perfluoro-2-aza-1-alkene and the phosphorus sulfide varies depending on the particular perfluoro-2-aza-1-alkene, the particular phosphorus sulfide, the particular reaction temperature, and whether the reaction is being carried out in a continuous or a batch process. Reaction times ranging from a few minutes, e.g., 1–10 minutes when high temperatures and a continuous process are employed, up to one hour or several days, e.g., 2 days when the lower temperatures and a batch process are employed. In general, the longer times are used with the lower reaction temperatures in a batch process. The use of long reaction times at the higher temperatures in the above range is undesirable because of the formation of other by-products under these conditions.

Heating of the reactants to the desired temperature may be accomplished by a step-wise procedure wherein the reactants are maintained for short periods of time at progressively higher temperatures. This procedure permits smooth operation of the process and avoids sudden increases of pressure in the reaction vessel. However, this procedure is not essential for operability, and the reactants may, if desired, be heated in one step to the reaction temperature.

An inert reaction medium can be employed in this process if desired although it is not essential. Such a medium is beneficial in removing heat from the reactants and in facilitating contact between the reactants. Specific reaction media that can be used include benzene, toluene and carbon bisulfide.

Commercially available phosphorus sulfides are satisfactory for use in the above process. The perfluoro-2-aza-1-alkene can be prepared from a tertiary perfluoroalkylamine by pyrolysis at 400–800° C. in the presence or absence of a catalyst such as sodium or aluminum fluoride. This process is described in greater detail in U.S. Patent 2,643,267.

An alternate method for preparing the lower perfluoroalkyl isothiocyanates involves reaction of a phosphorus sulfide with an N-trifluoromethyl-N-perfluoroalkylamine in which the perfluoroalkyl group contains up to 8 carbon atoms, under the general conditions of proportions of reactants, temperature, pressure and time of reaction described above for the first method. As in the first method, phosphorus pentasulfide is the preferred phosphorus sulfide reactant. However, in this method larger proportions of phosphorus pentasulfide are preferred. For example, the molar ratio of the perfluoroalkylamine to phosphorus pentasulfide ($P_4S_{10}$) preferably ranges from 7:1 to 1:2.

It is desirable, and in some cases preferred, to include an alkali metal fluoride, e.g., sodium fluoride, in the reaction mixture to absorb hydrogen fluoride that is formed; however, this is not essential for operability of the process.

The N-trifluoromethyl-N-perfluoroalkylamine starting material for this alternate process can be prepared by known methods. For example, it can be prepared by addition of hydrogen fluoride to a perfluoroazomethine as described in U.S. Patent 2,643,267 and by Barr and Haszeldine in J. Chem. Soc., 1955, 1881. Bis(trifluoromethyl)amine can also be prepared by reaction of hydrogen fluoride with cyanogen, a cyanogen halide, or a cyanuric halide at a temperature of at least 125° C. under substantially anhydrous conditions as described in U.S. Patent 3,077,499.

Another method for preparing lower perfluoroalkyl isothiocyanates involves reaction of hydrogen sulfide with an N-trifluoromethyl-N-perfluoroalkylamine in which the perfluoroalkyl group contains up to 8 carbon atoms, under the general conditions of temperature, pressure and time specified above in the description of the first method. Although reaction takes place essentially between one mole of the perfluoroalkylamine and one mole of hydrogen sulfide, an excess of 20–50% of either reactant may be used. Preferably, the reaction is carried out in the presence of an alkali metal fluoride, e.g., sodium fluoride, but this is not essential. Sufficient alkali metal fluoride is used to absorb all the hydrogen fluoride that is liberated, two to five moles of sodium fluoride per mole of hydrogen sulfide being satisfactory. Preferably, the alkali metal fluoride is finely divided.

The products of this invention are illustrated in further detail by the following examples in which the proportions of ingredients are expressed in parts by weight unless otherwise specified.

Since the exact chemical reactions occurring in these processes are not known in detail, the equations shown are merely intended to express the general overall reactions.

EXAMPLE I

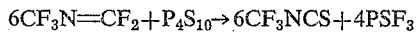

A mixture of 15 parts of pentafluoro-2-aza-1-propene and 25 parts of phosphorus pentasulfide in a closed reaction vessel lined with the corrosion-resistant alloy known as "Hastelloy," having a capacity of 240 parts of water, and capable of being agitated by shaking is heated at 100° C. for 2 hours, at 125° C. for 2 hours, and at 150° C. for 5 hours. The reactor and its contents are then cooled and the volatile product amounting to 28 parts is collected in a stainless steel cylinder cooled in liquid nitrogen. Low temperature distillation gives a forerun having a boiling point of −45° C. to +6° C. and then 4.5 parts of colorless trifluoromethyl isothiocyanate boiling at +6° C. to +8° C. The fluorine nuclear magnetic resonance spectrum shows a single broad resonance of $CF_3$. The infrared absorption (gas) shows bands at 4.98 microns (NCS) and at 7.9 and 8.3 microns (CF).

*Analysis.*—Calc'd for $C_2F_3NS$: F, 44.8%; S, 25.2%. Found: F, 44.78%; S, 26.31%.

EXAMPLE II $(CF_3)_2NH + P_4S_{10} \rightarrow CF_3NCS + PSF_3$

A mixture of 25 parts of N,N-bis(trifluoromethyl)-amine and 35 parts of phosphorus pentasulfide is placed in a reaction vessel having a capacity of 240 parts of water and lined with a corrosion-resistant alloy known as "Hastelloy." The closed vessel is shaken and heated at 150° C. for 2 hours, at 175° C. for 2 hours, and at 200° C. for 3 hours. After cooling the reaction vessel and contents, there is obtained 31 parts of volatile product. Low temperature distillation of this product gives largely material boiling below 0° C. Gas chromatography of the distillate shows the presence of trifluoromethyl isothiocyanate in small amount.

EXAMPLE III $(CF_3)_2NH + P_4S_{10} \rightarrow CF_3NCS + PSF_3$

A reaction vessel of the type used in the preceding examples is charged with a mixture of 25 parts of N,N-bis-(trifluoromethyl)amine and 35 parts of phosphorus pentasulfide and heated at 100° C. for 2 hours, 125° C. for 2 hours, and 150° C. for 8 hours. After cooling the reaction vessel, there is isolated 58 parts of volatile product which on low temperature distillation gives 9 parts of trifluoromethyl isothiocyanate boiling at 4–6° C. This product is identified by gas chromatography and by its infrared absorption spectrum.

EXAMPLE IV

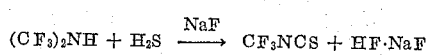

A reaction vessel of the type used in the preceding examples but having a capacity of 145 parts of water is charged with a mixture of 19 parts of N,N-bis(trifluoromethyl)amine, 5 parts of hydrogen sulfide, and 15 parts of powdered sodium fluoride, and is heated at 100° C. for 2 hours, at 125° C. for 2 hours, at 150° C. for 2 hours, and at 175° C. for 5 hours. After cooling the reaction vessel, there is isolated in a stainless steel cylinder cooled in liquid nitrogen 5 parts of volatile product. Trifluoromethyl isothiocyanate is separated from this volatile product by gas chromatography and is identified by means of its infrared absorption spectrum.

In addition to the specific perfluoroalkyl isothiocyanate illustrated in the above examples, the products of this invention include any perfluoroalkyl isothiocyanate of the formula $R_fNCS$ wherein $R_f$ is perfluoroalkyl of 1–8 carbon atoms. Such perfluoroalkyl isothiocyanates can be prepared by the general procedures described hereinbefore. More particularly, when the pentafluoro-2-aza-1-propene of Example I is replaced by the specific perfluoro-2-aza-1-alkenes listed in the first column of Table I in the reaction with phosphorus pentasulfide by the procedure described in that example, the specific perfluoroalkyl isothiocyanates listed in the second column of Table I are produced.

*Table I.—Preparation of perfluoroalkyl isothiocyanates from perfluoro-2-azo-1-alkenes*

| Perfluoro-2-aza-1-alkene | Perfluoroalkyl Isothiocyanate |
|---|---|
| $C_2F_5N=CF_2$ | $C_2F_5NCS$. |
| $CF_3CF_2CF_2N=CF_2$ | $CF_3CF_2CF_2NCS$. |
| $CF_3(CF_2)_3N=CF_2$ | $CF_3(CF_2)_3NCS$. |
| $CF_3(CF_2)_5N=CF_2$ | $CF_3(CF_2)_5NCS$. |
| $CF_3(CF_2)_7N=CF_2$ | $CF_3(CF_2)_7NCS$. |

Similarly, when the specific N,N-bis(trifluoromethy)-amine of Examples II, III and IV is replaced by the specific N-trifluoromethyl-N-perfluoroalkylamines listed in the first column of Table II in the reaction with phosphorus pentasulfide or with hydrogen sulfide by the procedures described in Examples II, III, and IV the specific perfluoroalkyl isothiocyanates listed in the second column of Table II are produced.

*Table II.—Preparation of perfluoroalkyl isothiocyanates from N-trifluoromethyl-N-perfluoroalkylamines*

| N-Trifluoromethyl-N-per-fluoroalkylamine | Perfluoroalkyl Isothiocyanate |
|---|---|
| $CF_3CF_2NHCF_3$ | $CF_3CF_2NCS$. |
| $CF_3(CF_2)_2NHCF_3$ | $CF_3(CF_2)_2NCS$. |
| $CF_3(CF_2)_3NHCF_3$ | $CF_3(CF_2)_3NCS$. |
| $CF_3(CF_2)_7NHCF_3$ | $CF_3(CF_2)_7NCS$. |

The perfluoroalkyl isothiocyanates of this invention are useful for various purposes. In particular, they are useful as agents for the shrinkproofing of wool as shown by the following illustrative example.

EXAMPLE A

A sample of wool fabric 74 x 25 mm. in size (0.38 g.), and 3 g. of trifluoromethyl isothiocyanate are charged to a glass reaction tube 7 mm. x 28 cm. and the tube is sealed under vacuum with liquid nitrogen cooling. The tube and contents are heated in a water bath at 60° C. for 0.75 hour and then in a steam bath at 100° C. for 0.5 hour. On cooling and opening the tube, there is obtained 1.5 ml. of volatile recovered $CF_3NCS$. The treated wool fabric is a very faint yellow in color. A portion of the treated wool is heated with an aqueous soap solution at 80° C. for 45 minutes, then heated again with fresh soap solution at the boiling point for 30 minutes and finally washed with water. After drying, the lengths of the samples are as follows:

| | Mm. |
|---|---|
| Original untreated wool | 74 |
| Original untreated wool, washed with soap solution 80° C./45 minutes, then 100° C./30 minutes | 65 |
| Wool treated with $CF_3NCS$ | 74 |
| Wool treated with $CF_3NCS$, then washed with soap solution 80° C./45 minutes, then 100° C./30 minutes | 72 |

Thus, the shrinkage on washing is 9 mm. for the untreated wool and only 2 mm. for the wool that had been treated with $CF_3NCS$.

The trifluoromethyl isothiocyanate-treated sample after washing maintains the orderly arrangement of the fibers in place, without swelling, fraying and disarrangement, whereas the untreated sample after washing shows disarranged, frayed fibers as well as the shrinkage. The perfluoroalkyl isothiocyanates of this invention thus possess the useful property of shrinkproofing wool and improving its stability to washing.

As many widely different embodiments of this invention may be made without departing from the spirit and scope thereof, it is to be understood that this invention is not limited to the specific embodiment thereof except as defined in the appended claims.

The embodiments of the invention in which an exclusive property or privilege is claimed are defined as follows:

1. A perfluoroalkyl isothiocyanate of the formula $$R_fNCS$$

wherein $R_f$ is a perfluoroalkyl group of 1 to 8 carbon atoms inclusive.

2. Trifluoromethyl isothiocyanate.
3. Pentafluoroethyl isothiocyanate.
4. Heptafluoropropyl isothiocyanate.

References Cited in the file of this patent

UNITED STATES PATENTS

| | | |
|---|---|---|
| 2,760,957 | Adelson | Aug. 28, 1956 |
| 2,955,129 | Mansfield | Oct. 4, 1960 |